Patented Sept. 18, 1951

2,567,963

UNITED STATES PATENT OFFICE 2,567,963

YELLOW PRINTING INK

Frederick E. Petke, Cincinnati, Ohio, assignor to Sterling Drug Inc., Wilmington, Del., a corporation of Delaware No Drawing. Application November 12, 1948, Serial No. 59,781

9 Claims. (Cl. 106—22)

This invention relates to color printing inks and to a method for preparation thereof.

My new inks have several very important advantages over the color inks previously available in that they have a high brilliance, are non-bronzing, are spectrally closer to theoretically perfect colors than the inks in present use, and have an exceptionally high degree of transparency. These properties especially adapt these new inks to the meeting of the exacting requirements of process color printing.

The chief yellow, red, and blue pigments in present use in process color printing are, respectively: chrome yellows, which may or may not be shaded with benzidine yellow; the lead lake of tetrabromofluorescein, or this pigment shaded with other substituted fluoresceins; and the hydrated lake of erioglaucine known as peacock blue. The inks prepared from these metallic lakes have several drawbacks, however, and efforts to improve their printing qualities have been, for the most part, unsuccessful. Thus, the yellow is very opaque and must therefore be used as a first down color; the red is partially opaque, is not spectrally perfect, and bronzes after drying to give a dull and dirty appearance; and the blue is not completely transparent and is not spectrally perfect.

I have not succeeded in obtaining new yellow, red, and blue printing inks, which in large degree overcome the drawbacks of those previously available, by employing as the pigment constituents in my inks water-insoluble organic ammonium salts of certain water-soluble acid dyes. Namely, these three groups of pigments are water-insoluble salts wherein the cation is in each case an organic ammonium ion containing 14-35 carbon atoms, and the anion is the anion, respectively, of: tartrazine (Colour Index No. 640) for preparation of yellow inks; phloxine B (Colour Index No. 778) for preparation of red inks; and erioglaucine A (Colour No. 671) for preparation of blue inks. The brilliantly colored inks obtained by the incorporation of these pigments into printing ink vehicles are almost completely transparent and thus the printer is not restricted to any definite order of laying down the colors. Moreover, the close approximation of these new inks to theoretically perfect colors eliminates much of the blurring effect which arises as a consequence of poor spectral qualities of many previously-known inks.

The water-insoluble pigments used in preparing my new printing inks are readily obtainable by a variety of methods. They can be conveniently obtained by adding to an aqueous solution of the dye, that is, tartrazine, phloxine B, or erioglaucine A, an aqueous solution of a water-soluble organic ammonium salt. Provided only that the resulting organic ammonium salt of the dye is water-insoluble, precipitation of the desired pigment takes place. The organic ammonium salt used as the precipitant is added to the dye solution until no further precipitation occurs. Any considerable excess of the precipitant should be avoided since this usually has an undesirable solubilizing effect on the precipitated dye salt. For this reason, after formation of further precipitate can no longer be observed in the reaction mixture, samples of the supernatant liquid are withdrawn and are treated with a small portion of the organic base to determine when no further precipitation of the dye salt is obtained. The organic ammonium salt of the dye, which in many cases comes down as a tar, is separated and is then dried in convention manner in a vacuum drier or is flushed directly into the desired ink vehicle. In some instances, it is convenient to form the organic ammonium salt of the dye directly in the printing ink vehicle, or in the vehicle solvent, by treating the dye in its free acid form with the appropriate amine or quaternary ammonium hydroxide.

The requisite water-insolubility of the organic ammonium salt of the acid dye is usually ensured if the cation, i. e. the ammonium ion, contains at least fourteen carbon atoms. When solubilizing groups, such as carbinol groups, are present in the cation, it is preferable that the cation contain eighteen or more carbon atoms. Although the upper limit of carbon content is not critical, it will be readily appreciated that very large values in this respect will diminish the relative concentration of dyestuff in the resulting precipitate and thus lead to a proportionate lessening of color in the printing ink. In general, I prefer to use as the precipitant a water-soluble ammonium salt containing about 18–35 carbon atoms in the cation in order to ensure that a satisfactory yield of the color is precipitated. The cation can be a primary, secondary, tertiary, or quaternary ammonium radical, and thus the precipitant can be a quaternary ammonium salt or an acid-addition salt of a primary, secondary, or tertiary amine. The choice of a particular precipitant will depend, of course, on various factors such as: cost and availability, the special requirements of the colored printing ink to be prepared, such as heat-stability; etc.

A group of insoluble organic ammonium salts derived from the anions of tartrazine, phloxine B, and erioglaucine A which I have found to be particularly useful in preparing my inks are those salts wherein the cation is a quaternary ammonium ion containing 18-35 carbon atoms. Advantageously, at least one of the substituents on the quaternary nitrogen atom is a radical having a minimum of seven carbon atoms. This preferred group of cations includes, for example, tetraalkyl - ammonium, aralkyl - trialkyl - ammonium, aryl-trialkylammonium, alkylphenoxy-alkyleneoxyalkylaralkyl-dialkyl-ammonium, and N - alkyl- and N - aralkyl - quinolinium and -pyridinium ions.

When a color printing ink having high stability toward heat is desired, I prefer to prepare the required pigment by interacting tartrazine, phloxine B, or erioglaucine A with a water-soluble salt of a rosin amine, or a mixture of rosin amines, having the general formula Y—CH$_2$NH$_2$, where Y is a tricyclic radical derived by removal of the carboxyl group from the structural formula of dehydroabietic acid, dihydroabietic acid, or tetrahydroabietic acid. These rosin amines can be prepared from rosin acids by reaction with ammonia to form the nitrile and then hydrogenating the nitrile, as illustrated by the following equations:

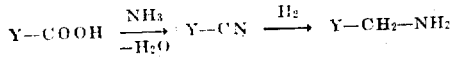

The method of preparation of rosin amines is set forth in British patent application No. 936/48, which is open to public inspection. A rosin amine mixture is available commercially under the name "Rosin Amine D." This mixture is a viscous, pale yellow liquid with a density of 0.997 at 25° C.; boiling range, 187–211° C. at 5 mm.; refractive index, 1.5410 at 20° C.; neutralization equivalent, 317; and nitrogen content, 4.2–4.5%.

My invention is illustrated by the following examples without, however, being limited thereto.

*Example 1*

A. To a solution of 500 g. of tartrazine (Colour Index No. 640) in 6000 ml. of water there was slowly added, with stirring, a 50% aqueous solution of benzyl-dimethyl-lauryl-ammonium chloride until precipitation of the dye was practically complete. This required about 1126 g. of the quaternary ammonium compound. The precipitated color was a tarry mass.

B. When, instead of the benzyl-dimethyl-lauryl-ammonium chloride in the above procedure, there was used amylnapthyl-triethyl-ammonium chloride, there was obtained a water-insoluble precipitate of the corresponding tartrazine salt.

C. The water-insoluble tartrazine dye salt obtained as shown in part A was separated from the bulk of the water and was flushed into a vehicle composed of 2100 g. of a rosin-modified phenol-aldehyde resin having an acid number of about 70 and 650 g. of butoxyethyl acetate and the mixture was then vacuum-dried in a jacketed flusher at 55–60° C. The water-free material thus obtained was then dissolved in a vehicle composed of 70 g. of half-second nitrocellulose dissolved in 30 g. of butoxyethyl acetate. The resulting solution was a tinctorially strong yellow toner.

D. To prepare a yellow printing ink, 90 g. of a yellow toner obtained as shown in part B was reduced with a solution of 28 g. of half-second nitrocellulose in 12 g. of butoxyethyl acetate. The resulting ink printed well and when set by application of heat gave a tack-free print. Alternatively, the toner is reduced with a mixture of an aliphatic petroleum fraction boiling at 500–550° F. and butoxyethyl carbitol.

*Example 2*

A. 500 g. of tetrachlorotetrabromofluorescein was dissolved in 6000 ml. of water containing 60 g. of sodium hydroxide at 50° C. To this solution of phloxine B (Colour Index No. 778) there was added slowly, with stirring, a concentrated aqueous solution of benzyl - dimethyl - lauryl - ammonium chloride until precipitation of the dye was practically complete. This required about 514 g. of the quaternary ammonium compound. The color was precipitated as a tar which was readily removed from the bulk of the water.

B. When amylbenzyl - benzyl - dimethyl - ammonium chloride or octadecyl-diethyl-amine is substituted for the benzyl-dimethyl-lauryl-ammonium chloride in the above procedure, there is obtained, as a water-insoluble precipitate in each instance, the corresponding tetrachlorotetrabromofluorescein salt.

C. The water-insoluble dye salt obtained as shown in part A was flushed into 540 g. of a vehicle composed of 2100 parts by weight of a rosin-modified phenol-aldehyde resin and 650 parts by weight of butoxyethyl acetate. The resulting mixture was dried under vacuum in a jacketed flusher at 50–60° C. The dry mixture was thinned by the addition of 270 g. of a vehicle composed of 2000 parts by weight of the rosin-modified phenol-aldehyde resin and 1950 parts by weight of polypropylene glycol. Further thinning was obtained by addition of 180 g. of butoxyethyl acetate. The resulting toner was much stronger tinctorially than a similar toner containing phloxine lead lake as the color.

D. To prepare a red printing ink, the red toner obtained as shown in part B was reduced with polypropylene glycol solutions of various rosin-modified resins to yield inks which printed well and could be set with steam or heat to give a tack-free print.

*Example 3*

A. To a solution of 500 g. of erioglaucine (Colour Index No. 671) there was added slowly, with stirring, a concentrated aqueous solution of benzyl-dimethyl-lauryl-ammonium chloride until precipitation of the dye was practically complete. This required about 650 g. of the quaternary ammonium compound. The precipitated dye salt was in the form of a blue tar which was readily removed from the bulk of the water.

B. When, instead of the benzyl-dimethyl-lauryl-ammonium chloride in the above procedure, there was used amylbenzyl-quinolinium chloride, there was obtained a water-insoluble precipitate consisting of the amylbenzyl-quinolinium salt with the anion of erioglaucine A.

C. The water-insoluble dye salt obtained as shown in part A was flushed into a vehicle prepared by dissolving 246 g. of polymerized wood rosin in 18 g. of butoxyethyl acetate. This mixture was vacuum-dried at 55–60° C. and then there was added 100 g. of diethylene glycol and 400 g. of a solution of 160 g. of refined shellac in 240 g. of polypropylene glycol. The resulting blue toner was much stronger tinctorially than a blue toner prepared from the hydrated lake of erioglaucine (peacock blue).

D. To prepare a blue printing ink, the blue tone obtained as shown in part B was reduced with polyglycol solutions of various printing ink binders. The inks thus obtained had good printing qualities and could be set with steam or heat to give a tack-free print.

*Example 4*

When a mixture of rosin amine hydrochlorides obtained by neutralization of the product known commercially as Rosin Amine D with hydrochloric acid was treated with tartrazine, with phloxine B, and with erioglaucine A, there were obtained in each instance as water-insoluble precipitates the corresponding rosin amine salts of the acid forms of tartrazine, phloxine B, and erioglaucine. Each of these pigment salts was introduced into various process printing ink vehicles, thereby producing in each case a yellow, red, or blue color printing ink which printed well and had high stability to heat, which permitted the ink to be set at a relatively high temperature.

As further specific examples of the ammonium salts which react with tartrazine, phloxine B, and erioglaucine A to yield the corresponding quaternary ammonium or amine salts of these three acid dyes which are useful in preparing my new inks, there can be mentioned: benzyl-dimethyl-lauryl-ammonium chloride, benzyl-dimethyl-cetyl-ammonium bromide, dodecyl-pyridinium chloride, allyl-dimethyl-octadecyl-ammonium sulfate, octadecenyl-dimethyl-benzyl-ammonium chloride, amylnaphthyl-triethyl-ammonium chloride, amylbenzyl-quinolinium chloride, amylbenzyl - benzyl-dimethyl - ammonium chloride, p - tert. - octylphenoxyethoxyethyl-dimethyl-benzyl chloride, trimethyl-stearoxyethyl-ammonium chloride, myristamido - propyl - dimethyl-benzyl-ammonium chloride, and cetyl-triethyl-ammonium bromide; and acid-addition salts of octadecyl-amine, cetyl-dimethyl-amine, diethyl-octadecenyl-amine, dibutyl-cetyl-amine, diethyl - oleamidoethyl - amine, lauryl - diethyl-amine, benzyl - dihexyl - amine, cetyl - diethyl-amine, lauryl-allyl-amine, lauryl-diethyl-amine, octadecyl-dimethyl-amine, p-stearamidophenyl-dimethyl - amine, p-tert.–octyl-phenoxylethoxy-ethyl - dimethyl-amine, stearoxy-ethyl-diethyl-amine, and oleamido-ethyl-diethylamine.

The colored printing inks made available by my invention have excellent printing qualities and can be readily adapted to the various modes of printing such as steam-set, heat-set, and rotogravure processes, by choosing ink vehicles of the types commonly used in these processes. When the ink vehicle comprises a binder and a liquid organic solvent, I prefer to use a polyglycol, for example diethylene glycol or polypropylene glycol, as the solvent in preparing a steam-set ink. In order to obtain a rotogravure ink, there can be used, for example, a relatively low boiling solvent such as a lower aliphatic alcohol, a lower aliphatic ketone, a lower aliphatic ester, or a combination of two or more solvents can be used, such as a mixture of isopropyl alcohol and a low boiling aliphatic or aromatic hydrocarbon such as naphtha or toluene. When the ink is to be of the heat-set variety, the solvent is preferably a mixture of a greater proportion of a high-boiling (400–600° F.) liquid hydrocarbon, for example an aliphatic petroleum fraction boiling at 500–550° F., and a lesser proportion of butoxy-ethyl acetate. As the binders in these inks, I prefer to employ a rosin-type binder such as a rosin-modified phenol aldehyde resin, a polymerized wood rosin, a rosin modified with an alpha, beta-unsaturated organic polybasic acid such as maleic or fumaric acid, a lime-modified rosin, a maleic-modified rosin ester, etc. Addition of a small portion of a different type of binder, for example zein, to the binders just mentioned is sometimes advantageous.

As will be readily understood, the addition of minor proportions of various modifying agents to the inks will vary according to humidity of the press room, type of press, etc.

The claims of the instant application are directed to the yellow inks of my invention. Reference is made to my copending U. S. patent applications Serial No. 59,782 and Serial No. 59,783, filed of even date with the present application, the claims of which are directed to my red inks and blue inks, respectively.

In the following claims, the term "tartrazine, Colour Index No. 640" will be understood to designate the sodium salt of 3-carboxy-5-hydroxy-1-p-sulfophenyl-4-sulfophenylazo-pyrazole.

I claim:

1. A yellow printing ink comprising an organic solvent, a resinous binder substantially soluble in said solvent, and a yellow pigment consisting essentially of a water insoluble salt consisting of the anion of tartrazine, Colour Index No. 640, and an organic ammonium cation containing 14 to 35 carbon atoms.

2. A yellow printing ink comprising an organic solvent, a resinous binder substantially soluble in said solvent, and a yellow pigment consisting essentially of a water insoluble salt consisting of the anion of tartrazine, Colour Index No. 640, and an organic quaternary ammonium cation containing 14 to 35 carbon atoms.

3. A yellow printing ink comprising an organic solvent, a resinous binder substantially soluble in said solvent, said binder consisting essentially of a phenol-aldehyde resin modified with rosin, and a yellow pigment consisting essentially of a water insoluble salt consisting of the anion of tartrazine, Colour Index No. 640, and an organic quaternary ammonium cation containing 14 to 35 carbon atoms.

4. A yellow printing ink comprising an organic solvent, a resinous binder substantially soluble in said solvent, said binder consisting essentially of a rosin modified with an alpha,beta-unsaturated organic polybasic acid selected from the class consisting of maleic acid and fumaric acid, and a yellow pigment consisting essentially of a water insoluble salt consisting of the anion of tartrazine, Colour Index No. 640, and an organic quaternary ammonium cation containing 14 to 35 carbon atoms.

5. A yellow printing ink comprising an organic solvent, a resinous binder substantially soluble in said solvent, said binder consisting essentially of a maleic-modified rosin ester, and a yellow pigment consisting essentially of a water insoluble salt consisting of the anion of tartrazine, Colour Index No. 640, and an organic quaternary ammonium cation containing 14 to 35 carbon atoms.

6. A yellow printing ink comprising an organic solvent, a resinous binder substantially soluble in said solvent, said binder consisting essentially of a polymerized wood rosin, and a yellow pigment consisting essentially of a water insoluble salt consisting of the anion of tartrazine, Colour Index No. 640, and an organic quaternary ammonium cation containing 14 to 35 carbon atoms.

7. A yellow printing ink comprising an organic solvent, a resinous binder substantially soluble in said solvent, said binder consisting essentially of a lime-modified rosin, and a yellow pigment consisting essentially of a water insoluble salt consisting of the anion of tartrazine, Colour Index No. 640, and an organic quaternary ammonium cation containing 14 to 35 carbon atoms.

8. A yellow printing ink comprising an organic solvent, a resinous binder substantially soluble in said solvent, and a yellow pigment consisting essentially of a water insoluble salt consisting of the anion of tartrazine, Colour Index No. 640, and an aralkyl-trialkyl ammonium cation containing 14 to 35 atoms, at least one of the alkyls containing a minimum of seven carbon atoms.

9. A yellow printing ink comprising an organic solvent, a resinous binder substantially soluble in said solvent, and a yellow pigment consisting essentially of a water insoluble salt consisting of the anion of tartrazine, Colour Index No. 640, and a rosin ammonium cation.

FREDERICK E. PETKE.

REFERENCES CITED

The following references are of record in the file of this patent:

UNITED STATES PATENTS

| Number | Name | Date |
|---|---|---|
| 2,022,678 | Kritchevsky et al. | Dec. 3, 1935 |
| 2,038,298 | Kiernan | Apr. 21, 1936 |

Certificate of Correction

Patent No. 2,567,963 September 18, 1951

FREDERICK E. PETKE

It is hereby certified that error appears in the printed specification of the above numbered patent requiring correction as follows:

Column 1, line 29, for "not" read *now*; column 3, line 55, for "amylnapthyl-" read *amylnaphthyl-*; column 4, line 74, for "tone" read *toner*; column 5, line 45, for "phenoxylethoxy-" read *phenoxyethoxy-*; column 6, line 50, for "furmaric" read *fumaric*;

and that the said Letters Patent should be read as corrected above, so that the same may conform to the record of the case in the Patent Office.

Signed and sealed this 1st day of January, A. D. 1952.

[SEAL]

THOMAS F. MURPHY,
*Assistant Commissioner of Patents.*